(12) United States Patent
Ozawa et al.

(10) Patent No.: US 6,342,306 B1
(45) Date of Patent: Jan. 29, 2002

(54) BEARING MATERIAL FOR POROUS HYDROSTATIC GAS BEARING AND POROUS HYDROSTATIC GAS BEARING USING THE SAME

(75) Inventors: Hideo Ozawa; Hiroshi Tsuji; Hirotsugu Tomita, all of Fujisawa (JP)

(73) Assignee: Oiles Corporation, Tokyo (JP)

( * ) Notice: Subject to any disclaimer, the term of this patent is extended or adjusted under 35 U.S.C. 154(b) by 0 days.

(21) Appl. No.: 09/433,300

(22) Filed: Nov. 3, 1999

(51) Int. Cl.[7] .............................. B32B 15/02; B22F 7/04; F16C 32/00
(52) U.S. Cl. ..................... 428/553; 384/902; 384/907; 384/912; 428/550; 428/552; 428/565; 428/676; 508/103; 508/104; 508/105
(58) Field of Search ................ 428/550, 552, 428/553, 565, 676; 384/902, 907, 912; 508/103, 104, 105

(56) References Cited

U.S. PATENT DOCUMENTS 4,505,987 A * 3/1985 Yamada et al. ............. 428/553

FOREIGN PATENT DOCUMENTS

JP             11158511 A1 * 6/1999 ............. B22F/7/00

* cited by examiner

*Primary Examiner*—Deborah Jones
*Assistant Examiner*—Robert R. Koehler
(74) *Attorney, Agent, or Firm*—Nixon & Vanderhye

(57) ABSTRACT

A bearing material includes a backing metal and a porous sintered metal layer sintered onto a surface of the backing metal, particles of an inorganic substance being contained at grain boundaries of the porous sintered metal layer. The porous sintered metal layer contains tin, nickel, phosphorus, and copper, and the particles of the inorganic substance are those of at least one of graphite, boron nitride, graphite fluoride, calcium fluoride, aluminum oxide, silicon oxide, and silicon carbide.

23 Claims, 1 Drawing Sheet

BEARING MATERIAL FOR POROUS HYDROSTATIC GAS BEARING AND POROUS HYDROSTATIC GAS BEARING USING THE SAME

BACKGROUND OF THE INVENTION

1. Field of the Invention

The present invention relates to a bearing material having a porous sintered metal layer and a porous hydrostatic gas bearing using this bearing material.

2. Description of the Related Art

Porous hydrostatic gas bearings have hitherto attracted attention as having excellent high-speed stability and high load carrying capacity, and although various studies have been made, there are yet a number of problems to be overcome in their practical use.

As for the porous hydrostatic gas bearing, a bearing material which is formed by combining a porous sintered metal compact with a backing metal provided with means for supplying a compressed gas is frequently used. As the material for forming the porous sintered metal compact in this bearing material, a material which mainly consists of bronze, an aluminum alloy, or stainless steel, particularly a material which mainly consists of bronze, is frequently used.

As the bearing material used for the porous hydrostatic gas bearing, sufficient gas permeability and the surface roughness on the order of $10^{-3}$ mm are required. However, in the case where the above-described bearing material is used for the hydrostatic gas bearing, the porous sintered metal compact itself has satisfactory gas permeability in a way, but since the dimensional accuracy and surface roughness of the porous sintered metal compact are not sufficient, its surface is subjected to machining in many cases.

This machining is mainly effected by lathe turning, milling, and grinding, but loading of the surface of the porous sintered metal compact is caused by such lathe turning, milling, and grinding, which substantially affects its gas permeability (drawing characteristic). In grinding, in particular, plastic flow takes place in the surface of the porous sintered metal compact, and burrs are consequently caused.

In addition, the porous sintered metal compact is combined with the backing metal provided with the means for supplying a compressed gas as described above, and in the case of, for example, a porous hydrostatic radial gas bearing, a means for press-fitting a hollow cylindrical porous sintered metal compact to a hollow cylindrical backing metal is adopted in this combining process.

In the case of a simple slide bearing, no particular problem occurs even if such a press-fitting means is adopted. In the porous hydrostatic gas bearing, however, since a very small gap is present between the contact portions of the two members which are apparently tightly press-fitted to each other, there are cases where the leakage of the gas from this gap is greater than the essential circulation of the compressed gas in the porous sintered metal compact.

The leakage of the gas from this gap leads to a decline in the performance such as a reduction of the load capacity as the porous hydrostatic gas bearing, so that it is preferable to prevent this leakage as much as possible.

To cope with this problem, if the interference is made large and fitting is effected with a large press-fitting force, the gap in this portion can be eliminated substantially completely. On the other hand, however, there is the possibility of occurrence of plastic flow of the sintered metal on the outer surface side of the porous sintered metal compact subjected to extremely large drawing by the backing metal. Hence, a problem newly arises in that, after fitting to the backing metal, the circulation of the compressed gas is substantially hampered on the fitted surface side of the porous sintered metal compact.

SUMMARY OF THE INVENTION

The present inventors discovered that a bearing material having a porous sintered metal layer fabricated under particular fabrication conditions is capable of maintaining gas permeability allowing its use as a porous hydrostatic gas bearing even after the bearing material is subjected to machining.

Accordingly, it is a primary object of the present invention to provide a bearing material capable of maintaining gas permeability, satisfactorily allowing its use as a porous hydrostatic gas bearing even after the bearing material is subjected to machining.

A secondary object of the present invention is to provide a bearing material which is free of unintended leakage of a supplied compressed gas.

A tertiary object of the present invention is to provide a porous hydrostatic gas bearing using the aforementioned bearing material.

The bearing material for a porous hydrostatic gas bearing in accordance with the present invention comprises: a backing metal; and a porous sintered metal layer sintered onto at least one surface of the backing metal, particles of an inorganic substance being contained at grain boundaries of the porous sintered metal layer.

In the bearing material in accordance with the present invention, component materials of the porous sintered metal layer are integrally joined to the backing metal on at least one surface of the backing metal.

In a preferred example, the porous sintered metal layer contains at least tin, nickel, phosphorus, and copper, and further contains iron or manganese, and the particles of the inorganic substance are those of at least one of graphite, boron nitride, graphite fluoride, calcium fluoride, aluminum oxide, silicon oxide, and silicon carbide.

The backing metal of the bearing material in accordance with the present invention is preferably formed of a metal selected from a group essentially consisting of iron, an iron alloy, copper, and a copper alloy. In a case where the backing metal is formed in a hollow cylindrical shape to form a porous hydrostatic gas radial bearing, the porous sintered metal layer is sintered onto an inner cylindrical surface of the backing metal, whereas in a case where the backing metal is formed in a planar shape to form a porous hydrostatic gas thrust bearing, the porous sintered metal layer is sintered onto one planar surface of the backing metal. It should be noted that the porous sintered metal layer in accordance with the present invention is also applicable to a linear motion bearing, i.e., a so-called slider.

The porous hydrostatic gas bearing in accordance with the present invention uses the aforementioned bearing material, and means for supplying a compressed gas to the porous sintered metal layer is provided in the backing metal.

In the porous hydrostatic gas bearing in accordance with the present invention, the roughness of the exposed surface of the porous sintered metal layer is $10^{-3}$ mm or less.

The particles of the inorganic substance in accordance with the present invention are those of at least one of graphite, boron nitride, graphite fluoride, calcium fluoride, aluminum oxide, silicon oxide, and silicon carbide. These substances do not undergo plastic deformation, which is otherwise the case with many metallic materials, and they are inorganic substances.

If such particles of the inorganic substance are compounded in a dispersed manner in a substrate formed of tin, nickel, phosphorus, and copper, as well as iron, manganese or the like in the porous sintered metal layer, such inorganic substances themselves do not undergo plastic deformation in machining. Additionally, since the inorganic substances function to disrupt and alleviate the plastic deformation of metal portions in the substrate of the porous sintered metal layer, it is possible to suppress the loading of the porous sintered metal layer in machining.

As for the porous sintered metal layer, a mixed powder composed of 4 to 10% tin, 10 to 40% nickel, 0.5 to 4% phosphorus, 3 to 10% graphite by weight, and the balance consisting of copper is pressed to fabricate a hollow cylindrical or planar green compact, and this green compact is inserted into the hollow cylindrical backing metal in contact with its inner peripheral surface or placed on the flat surface of the planar backing metal, the backing metal being formed of such as iron, an iron alloy, copper, or a copper alloy. This assembly is sintered in a reducing atmosphere or a vacuum at a temperature of 800 to 1,150° C. for 20 to 60 minutes, thereby forming the porous sintered metal layer. During sintering, it suffices if the inner peripheral surface or flat surface of the green compact is pressed by using an appropriate means so as to press the green compact against the inner peripheral surface or flat surface of the backing metal.

Compressed-gas supplying holes are formed in advance in the backing metal, and supplying grooves are formed in advance on its inner peripheral surface or flat surface. As the compact-pressing pressure in the fabrication of the green compact, 2 to 7 tons/cm$^2$ or thereabouts is preferable.

Thus a bearing material having a porous sintered metal layer sintered onto one surface of the backing metal can be obtained. The exposed surface of the porous sintered metal layer of the bearing material thus obtained is subjected to machining by grinding or lapping so that its roughness becomes $10^{-3}$ or less, thereby obtaining a desired porous hydrostatic gas bearing. Preferably, the machining is effected with a working allowance in a range of approximately $10^{-1}$ mm.

It became clear that, in the porous hydrostatic gas bearing obtained, the loading of the porous sintered metal layer in machining can be suppressed to about 50%. In addition, it was confirmed through a microscopic examination of the junction surface that dispersion of metallic components has occurred mutually between the porous sintered metal layer and the backing metal, and that the porous sintered metal layer is firmly bonded to and integrated with the backing metal, and it was confirmed that its bonding strength exhibits 1,000 kg/cm$^2$ or more. It was also revealed that there is no gap between the two members, and that leakage of the compressed gas from the junction between the two members is nil.

Alternatively, the porous hydrostatic gas bearing may be fabricated as follows. A mixed powder composed of 0 to 50% iron and 0 to 25% manganese by weight and the balance consisting of copper is further added to the mixed powder having the above-described components for forming the porous sintered metal layer. An aqueous solution of an organic binder is uniformly mixed with that mixture to obtain a stock powder. The stock powder is fed to a rolling roll to form a rolled sheet made of the stock powder, and this rolled sheet is cut to a desired size. The cut rolled sheet is formed into a hollow cylindrical shape and is inserted into the hollow cylindrical backing metal in contact with its inner peripheral surface, or the cut rolled sheet itself is placed on the flat surface of the planar backing metal. This assembly is sintered in a reducing atmosphere or a vacuum at a temperature of 870 to 1,150° C. under a pressure of 0.1 to 5.0 kgf/cm$^2$ for 20 to 120 minutes, thereby simultaneously effecting the sintering of the rolled sheet and the diffusion and bonding to the backing metal. A bearing material having the porous sintered metal layer sintered onto one surface of the backing metal is thus formed. The exposed surface of the porous sintered metal layer of the bearing material thus obtained is subjected to machining in the same way as described above, thereby obtaining a desired porous hydrostatic gas bearing.

The green density of the rolled sheet in this example was 5.48 to 6.72 g/cm$^3$, and its thickness was 1.38 to 1.83 mm. Although the density and porosity of the porous sintered metal layer obtained differ depending on the setting of sintering time and the temperature, the sintered density was generally 5.15 to 6.19 g/cm$^3$ and the porosity (oil content equivalent) was 21.1 to 34.1 vol. % under the above-described conditions. In the bearing material thus manufactured, the porous sintered metal layer was diffused and integrally bonded to the backing metal, the leakage of the compressed gas from the junction was nil. It was thus confirmed that the bearing material in accordance with the present invention can be used fully satisfactorily as the porous hydrostatic gas bearing.

Hereafter, a description will be given of preferred embodiments of the present invention with reference to the accompanying drawings.

DESCRIPTION OF THE PREFERRED EMBODIMENTS

Figure 1:
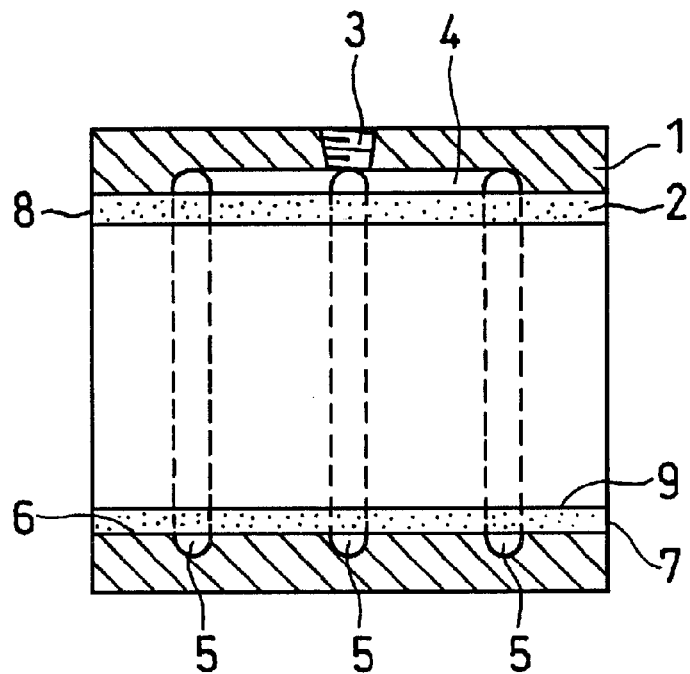
FIG. 1 is a cross-sectional view of a hollow cylindrical porous hydrostatic gas bearing in accordance with a preferred embodiment of the present invention.

In FIG. 1, reference numeral 1 denotes a metallic hollow cylindrical backing metal made of iron, an iron alloy, copper, or a copper alloy; numeral 2 denotes a porous sintered metal layer sintered onto an inner peripheral surface which is one surface of the backing metal 1; numerals 3, 4, and 5 denote compressed-gas supplying means provided in the backing metal 1, wherein numeral 3 denotes a compressed-gas supplying hole, 5 denotes an annular groove, and 4 denotes a conducting groove for allowing the annular grooves 5 to communicate with each other; and numeral 6 denotes a junction between the porous sintered metal layer 2 and the backing metal 1, and the porous sintered metal layer 2 and the backing metal 1 are completely bonded to and integrated with each other at the junction 6. As described above, the porous sintered metal layer 2 is formed by sintering a hollow cylindrical green compact or a rolled sheet onto the backing metal 1.

It should be noted that since a gas escapes from both annular end faces 7 and 8 of the hollow cylindrical porous sintered metal layer 2, and the discharge pressure of the gas from an inner peripheral surface 9 of the layer 2 declines, it suffices if sealing is effected by coating the end faces 7 and 8 with an adhesive agent or the like.

Figure 2:
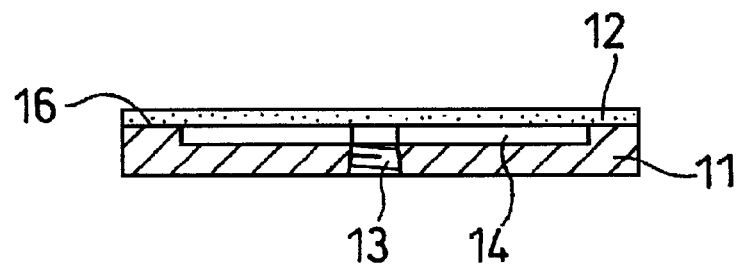
FIG. 2 is a cross-sectional view of a planar porous hydrostatic gas bearing in accordance with another preferred embodiment of the present invention.

In FIG. 2, reference numeral 11 denotes a planar backing metal; numeral 12 denotes a porous sintered metal layer sintered onto one flat surface which is one surface of the backing metal 11; numerals 13 and 14 denote compressed-gas supplying means provided in the backing metal 11, and denote a compressed-gas supplying hole and a supplying groove, respectively; and numeral 16 denotes a junction between the porous sintered metal layer 12 and the backing metal 11, and the porous sintered metal layer 12 and the backing metal 11 are completely bonded to and integrated with each other at the junction 16. As described above, this porous sintered metal layer 12 is also formed by sintering a planar green compact or a rolled sheet onto the backing metal 11. In this example as well, it is preferable to effect the aforementioned sealing.

As described above, since particles of an inorganic substance of graphite or the like are contained at grain boundaries of the porous sintered metal layer, even if the bearing material in accordance with the present invention is subjected to machining, the loading of its surface is suppressed, and an ideal drawn structure can be obtained. In addition, since the porous sintered metal layer is integrated with the backing metal by bonding, the leakage of a compressed gas from this junction is nil, and the deformation of the sintered layer due to the supplied gas pressure can be reduced to a minimum.

It should be noted that in a case where a component which functions as a solid lubricant for a slide bearing, such as graphite, boron nitride, graphite fluoride, or the like, is contained in the porous sintered metal layer, since all of these materials excel in the sliding friction characteristic, there is an advantage, among others, in that even if a shaft and the porous hydrostatic gas bearing come into contact with each other when the shaft is stationary or at the time of starting, the wear of the members can be very small.

What is claimed is:

1. A bearing material for a porous hydrostatic gas bearing, comprising:
   a backing metal; and
   a porous sintered metal layer sintered onto at least one surface of said backing metal,
   said porous sintered metal layer containing particles of an inorganic substance and including at least manganese.

2. A bearing material for a porous hydrostatic gas bearing according to claim 1, wherein said porous sintered metal layer is integrally joined to said backing metal.

3. The bearing material for a porous hydrostatic gas bearing according to claim 1 or 2, wherein said porous sintered metal layer contains at least tin, nickel, phosphorus and copper, and the particles of the inorganic substance are selected from the group consisting of graphite, boron nitride, graphite fluoride, calcium fluoride, aluminum oxide, silicon oxide and silicon carbide.

4. A bearing material for a porous hydrostatic gas bearing according to claim 3, wherein the porous sintered metal layer further contains iron.

5. A bearing material for a porous hydrostatic gas bearing according to claim 1, 2 or 4, wherein said backing metal is formed of a metal selected from the group consisting of iron, an iron alloy, copper and a copper alloy.

6. A bearing material for a porous hydrostatic gas bearing according to claim 1 or 2, wherein said backing metal is formed in a hollow cylindrical shape, and said porous sintered metal layer is sintered onto an inner cylindrical surface of said backing metal.

7. A bearing material for a porous hydrostatic gas bearing according to claim 1 or 2, wherein said backing metal is formed in a planar shape, and said porous sintered metal layer is sintered onto one planar surface of said backing metal.

8. A porous hydrostatic gas bearing using the bearing material according to claim 1 or 2, wherein means for supplying a compressed gas to said porous sintered metal layer is provided in said backing metal.

9. A porous hydrostatic gas bearing comprising:
   a bearing material including a backing metal, and a porous sintered metal layer sintered onto at least one surface of said backing metal, and means provided in said backing metal for supplying a compressed gas to said porous sintered metal layer,
      wherein particles of an inorganic substance are contained at grain boundaries of said porous sintered metal layer.

10. A porous hydrostatic gas bearing according to claim 9, wherein said porous sintered metal layer is integrally joined to said backing metal.

11. A hydrostatic gas bearing according to claim 9 or 10, wherein said porous sintered metal layer contains at least tin, nickel, phosphorus and copper, and the particles of the inorganic substance are selected from the group consisting of graphite, boron nitride, graphite fluoride, calcium fluoride, aluminum oxide, silicon oxide and silicon carbide.

12. A porous hydrostatic gas bearing according to claim 11, wherein the porous sintered metal layer further contains iron or manganese.

13. A porous hydrostatic gas bearing according to claim 9 or 10, wherein said backing metal is formed of a metal selected from the group consisting of iron, an iron alloy, copper and a copper alloy.

14. A porous hydrostatic gas bearing according to claim 9 or 10, wherein said backing metal is formed in a hollow cylindrical shape, and said porous sintered metal layer is sintered onto an inner cylindrical surface of said backing metal.

15. A porous hydrostatic gas bearing according to claim 9 or 10, wherein said backing metal is formed in a planar shape, and said porous sintered metal layer is sintered onto one planar surface of said backing metal.

16. A porous hydrostatic gas bearing comprising:
   a bearing member including a backing metal, a porous sintered metal layer sintered onto at least one surface of said backing metal, and means provided in said backing metal for supplying a compressed gas to said porous sintered metal layer,
      wherein said porous sintered metal layer includes an inorganic substance.

17. A porous hydrostatic gas bearing according to claim 16, wherein said porous sintered metal layer is integrally joined to said backing metal.

18. A hydrostatic gas bearing according to claim 16 or 17, wherein said porous sintered metal layer contains at least tin, nickel, phosphorus, and copper, and the inorganic substance is selected from the group consisting of graphite, boron nitride, graphite fluoride, calcium fluoride, aluminum oxide silicon oxide and silicon carbide.

19. A porous hydrostatic gas bearing according to claim 18, wherein the porous sintered metal layer further contains iron or manganese.

20. A porous hydrostatic gas bearing according to claim 16 or 17, wherein said backing metal is formed of a metal selected from a group consisting of iron, an iron alloy, copper and a copper alloy.

21. A porous hydrostatic gas bearing according to claim 16 or 17, wherein said backing metal is formed in a hollow cylindrical shape, and said porous sintered metal layer is sintered onto an inner cylindrical surface of said backing metal.

22. A porous hydrostatic gas bearing according to claim 16 or 17, wherein said backing metal is formed in a planar shape, and said porous sintered metal layer is sintered onto one planar surface of said backing metal.

23. A porous hydrostatic gas bearing according to claim 9 or 16, wherein said porous sintered metal layer is subjected on an exposed surface thereof to machining by grinding or lapping.

* * * * *